US008573535B2

(12) United States Patent
Sanderson

(10) Patent No.: US 8,573,535 B2
(45) Date of Patent: Nov. 5, 2013

(54) SHAPE-CHANGE MATERIAL AND METHOD

(75) Inventor: Terry M. Sanderson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1085 days.

(21) Appl. No.: 12/412,477

(22) Filed: Mar. 27, 2009

(65) Prior Publication Data
US 2010/0243808 A1 Sep. 30, 2010

(51) Int. Cl.
B64C 3/54 (2006.01)

(52) U.S. Cl.
USPC ............................. 244/99.8; 244/218

(58) Field of Classification Search
USPC ........... 428/319.1, 414, 416, 425.8; 219/201, 219/539; 244/99.8, 134 D, 218; 148/563
See application file for complete search history.

(56) References Cited

U.S. PATENT DOCUMENTS

| | | | |
|---|---|---|---|
| 2,559,827 A | | 7/1951 | Northrop |
| 3,628,352 A | | 12/1971 | Stuemky |
| 4,556,050 A | * | 12/1985 | Hodgson et al. ................ 600/30 |
| 5,049,591 A | | 9/1991 | Hayashi et al. |
| 5,082,207 A | | 1/1992 | Tulinius |
| 5,181,678 A | | 1/1993 | Widnall et al. |
| 5,558,304 A | * | 9/1996 | Adams ..................... 244/134 A |
| 5,662,294 A | | 9/1997 | Maclean et al. |
| 5,686,003 A | * | 11/1997 | Ingram et al. ................. 219/201 |
| 5,804,276 A | * | 9/1998 | Jacobs et al. .................. 428/110 |
| 6,010,098 A | | 1/2000 | Campanile et al. |
| 6,264,136 B1 | | 7/2001 | Weston |
| 6,410,886 B1 | * | 6/2002 | Julien ........................... 219/213 |
| 6,705,568 B2 | | 3/2004 | Lee |
| 6,834,835 B1 | * | 12/2004 | Knowles et al. .............. 244/198 |
| 7,777,165 B2 | | 8/2010 | Sanderson et al. |
| 7,896,294 B2 | * | 3/2011 | Dittrich ......................... 244/219 |
| 7,939,178 B2 | * | 5/2011 | Sar et al. ....................... 428/591 |
| 2002/0195177 A1 | | 12/2002 | Hinkley et al. |

(Continued)

FOREIGN PATENT DOCUMENTS

| | | |
|---|---|---|
| CN | 101028866 | 9/2007 |
| EP | 0361418 A2 | 4/1990 |

(Continued)

OTHER PUBLICATIONS

Shaw, John A. et al., "The Manufacture of Niti Foams", Proceedings of 2002 ASME International Mechanical Engineering Congress and Exposition, (2002), pp. 1-10.

(Continued)

Primary Examiner — Tien Dinh
Assistant Examiner — Michael Kreiner
(74) Attorney, Agent, or Firm — Renner, Otto, Boisselle & Sklar, LLP

(57) ABSTRACT

A shape-change material includes a shape memory material layer with an electrically conductive layer on a surface of the shape memory material layer. The conductive material may be used to heat the shape memory material by electrical resistance heating. The conductive material may be a primary heater, providing the heating to cause softening or shape change in the shape memory material, or may be a secondary heater in conjunction with a greater amount of heating from a primary heater, such as a conductive plate that provides electrical resistance heating to a surface of the shape memory material on an opposite side of the shape memory material from the conductive material. One use for the shape-change material is as the skin material for a shape changing material.

8 Claims, 3 Drawing Sheets

(56) References Cited

U.S. PATENT DOCUMENTS

| | | |
|---|---|---|
| 2003/0036090 A1 | 2/2003 | Patil et al. |
| 2004/0086699 A1 | 5/2004 | Schneider |
| 2005/0157893 A1 | 7/2005 | Pelrine et al. |
| 2005/0206096 A1 | 9/2005 | Browne et al. |
| 2007/0107189 A1 | 5/2007 | Prichard et al. |
| 2008/0061192 A1 | 3/2008 | Sullivan |
| 2009/0072094 A1 | 3/2009 | Sanderson et al. |
| 2009/0206192 A1 | 8/2009 | Sanderson et al. |
| 2009/0283643 A1 | 11/2009 | Sar et al. |
| 2009/0283936 A1 | 11/2009 | Sanderson et al. |
| 2009/0286101 A1 | 11/2009 | Sar et al. |
| 2010/0030308 A1 | 2/2010 | Anderson et al. |
| 2010/0282917 A1 | 11/2010 | O'Shea |
| 2012/0056005 A1* | 3/2012 | Webster ............... 239/11 |
| 2012/0213969 A1* | 8/2012 | Mather et al. ........... 428/156 |

FOREIGN PATENT DOCUMENTS

| | | | |
|---|---|---|---|
| EP | 0905019 | A2 | 3/1999 |
| EP | 1607602 | | 12/2005 |
| GB | 2445099 | | 6/2008 |
| JP | 60145385 | A * | 7/1985 |
| JP | 02-092912 | A | 4/1990 |
| JP | 02-239930 | A | 11/1990 |
| JP | 7205894 | A * | 8/1995 |
| JP | 2002-260449 | A | 9/2002 |
| JP | 2009047179 | A * | 3/2009 |
| WO | 9308013 | A1 | 4/1993 |
| WO | 9324300 | A1 | 12/1993 |
| WO | 03068584 | | 8/2003 |
| WO | 2007001392 | | 1/2007 |
| WO | 2008068472 | A1 | 6/2008 |

OTHER PUBLICATIONS

Perkins, David A. et al., "Morphing Wing Structures for Loitering Air Vehicles", 45th AIAA/ASME/ASCE/AHS/ASC Structures, Structural Dynamics & Materials Conference, (2004), pp. 1.

International Search Report and Written Opinion from corresponding International Application No. PCT/US09/68655.

Office Action from corresponding Japanese Application No. 2011-551051, mailed on Dec. 18, 2012.

* cited by examiner

SHAPE-CHANGE MATERIAL AND METHOD

BACKGROUND OF THE INVENTION

1. Technical Field of the Invention

The invention is in the field of reconfigurable materials and structure members.

2. Description of the Related Art

Shape memory materials have been used for morphing or shape changing structures, components, and hardware. There is room for improvement in the area of use of shape memory materials.

SUMMARY OF THE INVENTION

According to an aspect of the invention, a shape memory material is heated on multiple sides, such as on opposite major surfaces.

According to another aspect of the invention, a shape memory material has a coating of conductive material, for example a conductive polymer having a thickness on the order of 10 microns.

According to yet another aspect of the invention, a shape-change material includes: a shape memory material layer; and an electrically conductive layer on a surface of the shape memory material layer. The conductive layer has a thickness on the order of tens of microns.

According to still another aspect of the invention, a shape-change material includes: a shape memory material layer; and an electrically conductive layer on a surface of the shape memory material layer; and a heater. The electrically conductive layer and the heater are thermally coupled to respective opposite major surfaces of the shape memory material layer, to provide heat flux into the shape memory material layer through the opposite major surfaces.

According to a further aspect of the invention, a method heating a shape memory material includes the steps of: heating a first major surface of the shape memory material; and heating a second major surface of the shape memory material, wherein the first major surface and the second major surface are on opposite sides of the shape memory material. The heating of the first major surface is electrical resistance heating performed through an electrically conductive material layer in contact with the first surface.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, illustrate aspects of the invention.

DETAILED DESCRIPTION

A shape-change material includes a shape memory material layer with an electrically conductive layer on a surface of the shape memory material layer. The conductive layer may be a flexible layer, for example on the order of 10 microns thick. The conductive layer may be a metal layer or an electrically conductive polymer layer, and may be formed by vapor deposition, such as chemical vapor deposition or physical vapor deposition, or by plating, such as electroplating. The conductive material may be used to heat the shape memory material by electrical resistance heating. The conductive material may be a primary heater, providing the heating to cause softening or shape change in the shape memory material, or may be a secondary heater in conjunction with a greater amount of heating from a primary heater, such as a conductive plate that provides electrical resistance heating to a surface of the shape memory material on an opposite side of the shape memory material from the conductive material. The shape-change material may have additional layers, such as an insulation layer on a surface of the conductive layer opposite the conductive layer surface. The insulation layer may be used to thermally insulate the conductive material layer, so as to prevent heat loss from the conductive layer and to direct more of the heat from the conductive layer to the shape memory material. One use for the shape-change material is as the skin material for a shape changing material. In such a use the conductive material layer may be located between the shape memory material and the external surface of the wing.

Figure 1:
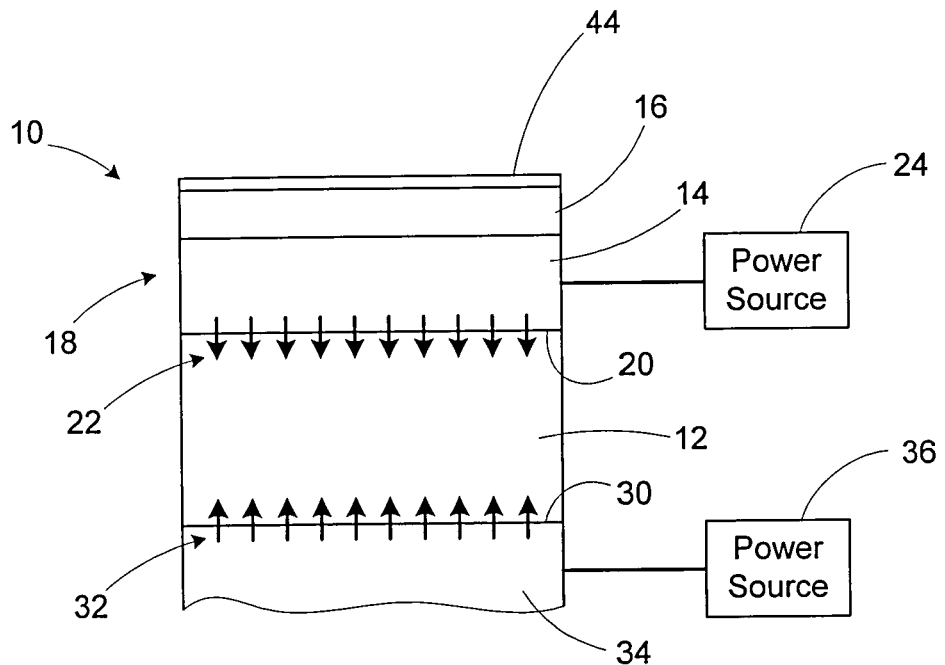
FIG. 1 is a cross sectional view of a shape change material in accordance with an embodiment of the present invention.

FIG. 1 shows a shape-change material 10 that includes a shape memory material layer 12, an electrically conductive material layer 14, and an optional thermal insulation layer 16. The material 10 may be used in any of a wide variety of situations in which heating of the shape memory material layer 12 is used to change the shape of the material 10. The material 10 is flexible in the sense that this shape change by heating may be accomplished, although it will be appreciated that the material 10 may be substantially rigid when not being involved in a shape change.

The electrically conductive material 14 is on a first major surface 18 of the shape memory material 12. The electrically conductive material 14 may be used as a first heater 20, to provide electrical resistance heating, to heat the shape memory material layer 12 through a first heat flux 22 from the conductive material 12 to the first major surface 18. The heat flux 22 may be selectively applied by selectively running electric current through the conductive material 14. A power source 24 may be provided to selectively apply the current across the conductive material layer 14 to initiate resistance heating.

In addition a second heater 28 may be in contact with or thermally coupled to a second major surface 30 of the shape memory material 12. The second heater 28 may be used to selectively apply a second heat flux 32 to the shape memory material 12, through the second major surface 30. The second heater 28 may be a resistance heater as well, for example an electric resistance heated plate heater 34, selectively heated by running current through it provided by a second power source 36. Alternatively the second heater 28 may be a different type of heater, one that does not use resistance heating as a heating method. Other heating mechanisms may include heating by magnetic induction or microwaves. It will be appreciated that a wide variety of other heating mechanisms are well known and available for use.

The conductive material 14 and the heater 28 may be used to heat the shape memory material 12, to change the shape of the shape memory material 12, or to allow external forces to change the shape of the material 12. The heater 28 may be the primary heater of the shape memory material 12, providing most of the heat for softening the material 12 and/or for changing the shape of the material 12. The conductive material 14 may be used as a secondary heater, providing additional heat flux and making the temperature rise in the material 12 faster and more uniform by applying the heat flux 22 on the opposite face (major surface) 18 of the material 12 from the heat flux 32. The heating from the conductive material 14 also may prevent heat loss that would otherwise occur through the first face (major surface) 18 of the material 12.

The heating of the shape memory material 12 may be part of a process of changing the shape of the shape-change material or structure 10. The heating of the shape memory material may soften the material 12 to allow shape change of the material 12. The shape change material 12 may then be cooled, either actively or passively, to restore rigidity to the shape change material 12 in its new shape. The force used to effect the shape change of the material 12 may come from any of a variety of sources. There may be an underlying structure or skeleton that may be moved to cause corresponding shape change in the shape-change material or structure 10. Alternatively external forces may be applied other than mechanically, such as by electrical or magnetic forces. Further, alternatively or in addition the shape memory characteristics of the shape memory material 12 may provide some or all of the force used in changing the shape-change material or structure 10.

The shape memory material 12 may include a shape memory polymer. The shape memory polymer may be a foam or a non-foam. The shape memory material 12 is defined herein as a material capable of elastic deformation at strains of at least 5%. Certain types of shape-changing material, such as polymer foams, may be capable of elastic deformation at much larger strains, such as at strains of 300% or 400%. The shape memory material 12 may be a foam material able to expand and contract in one or more directions, changing the volume of the material. The shape memory material 12 may also be a solid material, which as used herein refers to a material that is substantially without voids. The shape memory material 12 may be a shape memory polymer material, either in solid form, as a foam, and/or as a gel.

It will be appreciated that a wide variety of suitable additives may be used to make a polymer a shape memory polymer. The glass transition temperature and other characteristics of the shape memory polymer material may be controlled by the type and amount of additives. Other characteristics for the shape memory polymer material may be suitability for the chemical or other environment that the material is exposed to. The shape memory material 12 may be either a polyurethane-based material or an epoxy-based material. Cyanate-ester-based materials may also be utilized. It will be appreciated that a wide variety of other polymers may be utilized. Foam materials have the advantage of having much greater strain capacities than neat resin materials. However it will be appreciated that foam materials have less stiffness than solid materials. The Poisson's ratio of the neat resin may be around 0.4 to 0.5. The Poisson's ratio of the shape memory polymer foam may be less than 0.1.

It will be appreciated that the material 12 need not necessarily be a shape memory polymer material. Elastomers or elastomer foams without shape memory properties may be used, with their shape controlled by electromagnetic forces, as described herein. However, shape memory polymers are advantageous in that such polymers can provide superior resistance to environmental degradation, and they are also formulated to have useful properties both above and below their glass transition temperature. Although the various embodiments are described herein with reference to shape memory polymer materials, it should be understood that these references are intended to also include polymer materials that do not have shape memory properties.

The conductive material 14 may be any of a variety of electrically conductive materials. One example is any of a wide variety of electrically conductive polymers. Another possibility is a conductive metal, such as copper. The conductive material 14 may be thin, for example on the order of 10 microns thick, or more broadly on the order of tens of microns thick. To give a non-limiting example, the conductive material may be as thick as 0.025 mm (0.001 inches). The conductive material 14 may be thin enough to be flexible, so that it can change shape along with the underlying shape memory material 12.

The conductive material 14 may be placed on the shape memory material 12 by a suitable deposition method, such as chemical vapor deposition or physical vapor deposition. Another possible method is electroplating of the conductive material 14 on the shape memory material 12.

The insulation layer 16 may be provided on the conductive material 14 to aid in preventing heat loss and in directing the heating from the conductive material 14, and in directing heat from the conductive material 14 into the shape memory material 12. The insulation layer 16 may be on an opposite major surface of the conductive material from the major surface (face) of the conductive material 14 that is in contact with the shape memory material 12. The conductive material 14 may thus be located between the shape memory material 12 and the insulation layer 16.

The insulation layer 16 may be any of a wide variety of lightweight materials that provide good thermal insulation. The insulation layer 16 may be made of a foam material, for example an elastomeric polymer foam such as polyurethane, although it will be appreciated that non-foam materials are alternatives.

A skin layer 44, such as a thin plastic layer, may be provided on the top surface of the insulation layer 16. The skin layer 44 may be desirable in situations where a smooth outer surface is desired for the shape-change material or structure 10. The skin 44 may provide a continuous outer surface that remain continuous and unbroken throughout the shape change process. Shape change while maintaining a continuous outer surface may be referred to herein as "morphing."

The shape-change material 10 has the advantage of quicker and more uniform heating of the shape memory material 12, relative to heating of the shape memory material 12 only from an interior heater. Heating using only an internal heater may require large temperature gradients across the shape memory material 12.

This temperature gradient may be large enough that in order for the temperature to reach at least a minimum activation temperature required to trigger shape memory effects, the temperature at other parts of the shape memory material 12 may exceed a temperature at which the material decomposes. It will be appreciated that this problem is exacerbated for thicker shape memory material 12. By providing heating on multiple surfaces of the shape memory material 12, such as opposite major surfaces 18 and 30, the shape memory material 12 may have a more uniform temperature. This may enable the shape memory material 12 to exceed the shape memory activation temperature substantially throughout the material 12, without exceeding the decomposition temperature anywhere in the material 12.

It has been shown previously that when an aircraft skin made of an epoxy based shape memory polymer foam is heated from the inside of the skin, and the outside of the skin is exposed to the atmosphere during flight, the resulting steady state temperature distribution will yield a temperature at least ten times higher on the inside surface of the skin than on the outside surface. The material considered in this study was an epoxy shape memory polymer foam, which had a glass transition temperature of about 75 degrees C. But the results in this study were non-dimensionalized and it was shown that a temperature gradient of an order of a magnitude would occur at steady state, for an aircraft skin made of any conventional or shape memory polymer. Decomposition temperatures of polymers are typically on the order of several hundred to around 1000 degrees C., depending on the polymer family. However, as the decomposition temperature of a polymer rises so does its glass transition temperature, and it is believed that there are no polymers in existence which could survive the temperature gradients that will occur when an aircraft skin is heated from the inside by a skin heater.

Figure 2:
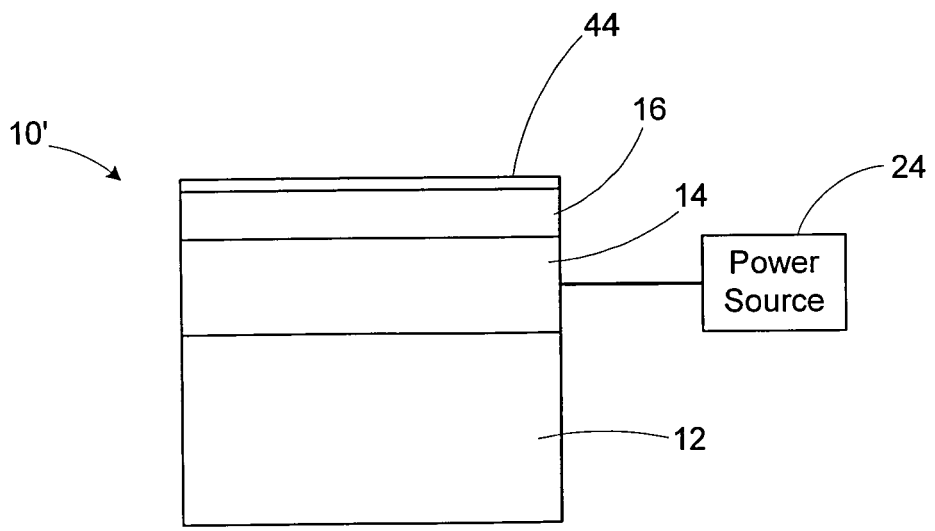
FIG. 2 is a cross section view of a shape change material in accordance with another embodiment of the present invention.

It will be appreciated that many alternative configurations are possible. To give one possibility, the conductive material 14 and the heater 28 may share the same power supply, rather than having different power supplies. FIG. 2 shows an alternative arrangement, in which a shape-change material 10' relies only on the conductive material layer 14 for resistive heater, dispensing with the heater 28 (FIG. 1) altogether.

The shape-change material 10 is shown in FIG. 1 as a layered structure. It will be appreciated that the material may be in a variety of configurations, such as planar or having a curved or circular cross section. The material 10 may be used all along the outside of a circular cross-section or rectangular cross-section member, or along part of the outside of such a member. Many other possible configurations are possible.

Figure 3:
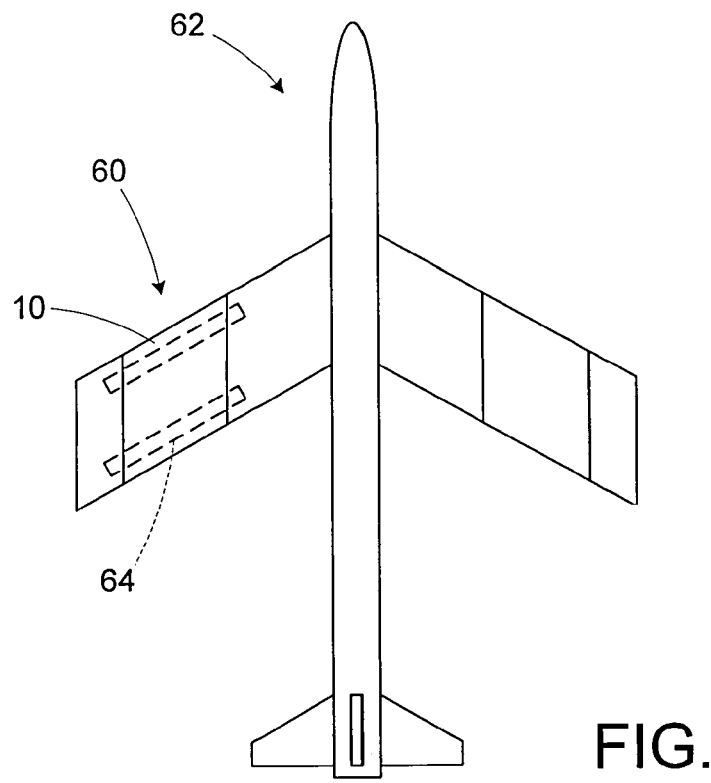
FIG. 3 is an oblique view of an aircraft with the shape change material of FIG. 1 incorporated into a wing, with the wing in a first configuration.
Figure 4:
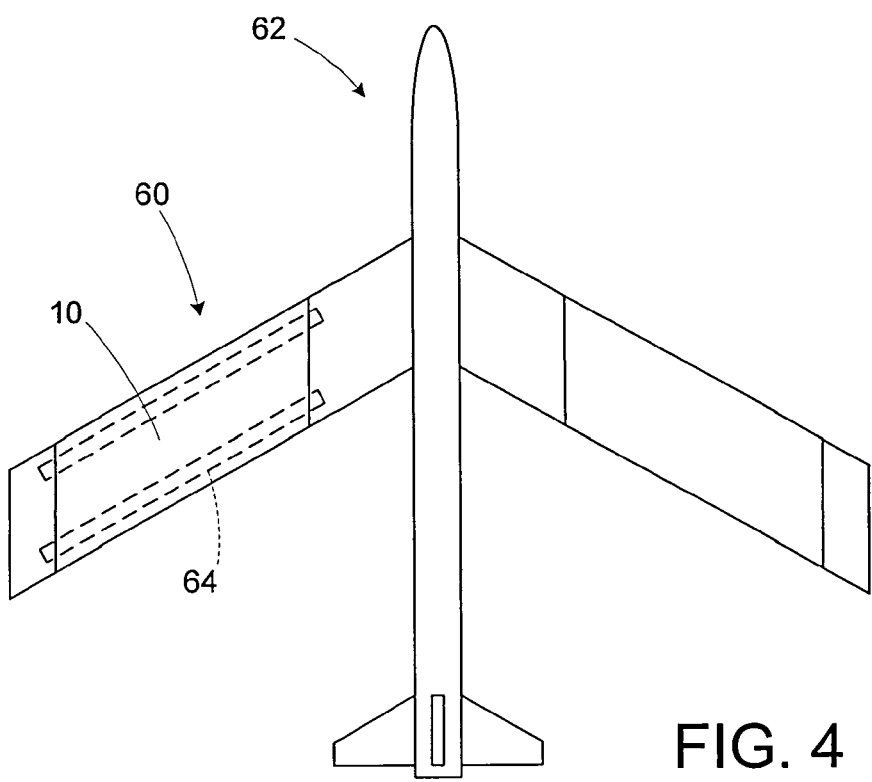
FIG. 4 is an oblique view of the aircraft of FIG. 3, with the wing in a second configuration.

FIGS. 3 and 4 show one possible use for the shape-change material 10, as a skin for an aircraft wing 60 of an aircraft 62. The wing 60 may transform from a relatively small wingspan configuration, shown in FIG. 3, to a relatively large wingspan configuration, shown in FIG. 4. The shape-change material 10 maintains a continuous outer skin surface as the wing 60 morphs from one configuration to another. The wing 60 may have an internal structure, such as a skeleton 64 consisting of one or more telescoping members 64, that provides structural integrity to the wing 60, and perhaps force for extending and retracting the wing 60 from one configuration to another. The heating system of the material 10 may be used to soften the shape memory material 12 (FIG. 1), with the skeleton used to provide the force to change the shape of the material 10. Heating the shape memory material 12 on both sides makes for a faster softening of the shape memory material 12, allowing for a faster transformation between wing shapes. In addition providing heat on the side of the material 10 facing the air stream helps counteract heat loss from the wing 60.

Figure 5:
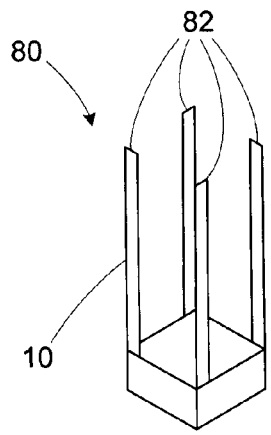
FIG. 5 is an oblique view of a structure with the shape change material of FIG. 1 incorporated into structural members, with the structure in a first configuration.
Figure 6:
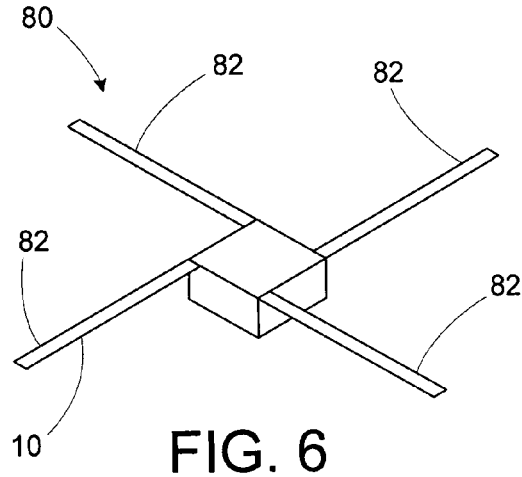
FIG. 6 is an oblique view of the structure of FIG. 5, with the structure in a second configuration.

FIGS. 5 and 6 show a structure 80 that includes the shape-change material 10 as a part of reconfigurable members 82. The structure 80 may be transformable from a first configuration, a stowed configuration shown in FIG. 5, to a second configuration, a deployed configuration shown in FIG. 6, in which the members 82 are opened up into an expanded configuration. The members 82 may include the shape-change material 10 around a central electrical heater or other heater that serves as the heater 28 (FIG. 1) for the material 10. Heating the material 10 using the central heaters and the conductive material 14 (FIG. 1) of the heaters causes the shape memory material 12 (FIG. 1) to regain a previously imprinted shape, the deployed shape shown in FIG. 6.

The structure 80 represents any of a variety of suitable structures that can employ the shape-change material 10. The possibilities for the structures range from the very small, for example biomedical tools such as for removing blockages in blood vessels, to potentially very large, such as unmanned air vehicles, manned aircraft, space structures including radar dishes and solar panels.

Figure 7:
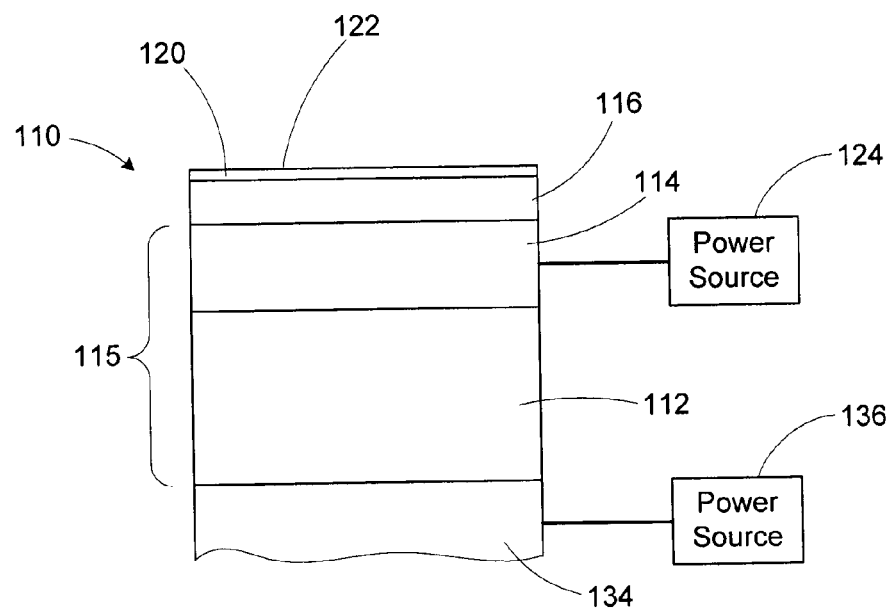
FIG. 7 is a cross sectional view of a shape change material in accordance with an alternate embodiment of the present invention.

FIG. 7 shows an alternative configuration shape change material 110. The shape change material 110 includes a shape memory material layer 112 and a conductive layer 114 that are different parts of a material layer 115 that has the same base material throughout, but that has different properties at different depths. The material layer 115 may have a shape memory material throughout, such as a shape memory polymer material as described above with regard to previous embodiments. The shape memory material layer 112 may be substantially neat or pure shape memory material, without any conductive material additives. The conductive layer 114 may contain conductive material additives in sufficient quantity so as to make the conductive layer 114 electrically conductive, and capable of use for resistive heating.

The material layer 115 may have graded electrical properties, ranging from being nonconductive (or less conductive) in the shape memory material layer 112 to being more conductive (electrically conductive enough to allow electrical resistance heating) in the conductive layer 114. The graded electrical properties may be produced by putting conductive material in the shape memory material in the conductive layer 114. The conductive material may be put in the shape memory material in the form of layers of conductive material particles, such as nano-sized to micron-sized particles of gold, silver, and/or platinum, to give only a few examples. Nano-sized particles may be up to 20-30% by weight of the material in the conductive layer 114. Micron-sized particles may be as much as 80% by weight of the material in the conductive layer 114. The conductive particles may be mixed into the material layer 115 at an appropriate location, and magnetic or other forces may be used to concentrate and/or maintain concentration of the conductive particles in the conductive layer 114. It will be appreciated that there may not be a sharp demarcation between the shape memory material layer 112 and the conductive layer 114, but rather a gradation of electrical properties between the two.

The material layer 115 may be covered with other layers having other suitable properties. For example an insulating layer 116 may overly the conductive layer 114, and/or a skin layer 120 may be located at a material surface 122. Other parts of the material 110 may be similar to those of the material 10 (FIG. 1), including use of a heater 134, and power sources 124 and 136.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A shape-change material comprising:
a shape memory material layer;
an electrically conductive layer on a surface of the shape memory material layer; and
a thermal insulating layer that thermally insulates the conductive layer, so as to prevent heat loss from the conductive layer and direct heat substantially from the conductive layer to the shape memory material layer;
wherein the conductive layer is flexible and changes shape along with the shape memory material layer;
wherein the electrically conductive layer is between the shape memory material layer and the insulating layer;
wherein the shape-change material is part of a configurable aircraft wing;
wherein the conductive layer is between the shape memory material layer and an external surface of the configurable aircraft wing;
wherein the conductive layer has an outer surface and an inner surface, with the outer surface closer than the inner surface to the external surface of the configurable aircraft wing;
wherein the outer surface of the conductive layer is in contact with the thermal insulating layer; and
wherein the inner surface of the conductive layer is on the surface of the shape memory material layer.

2. The shape-change material of claim 1, wherein the external surface of the wing is a smooth skin of the shape changing material.

3. The shape-change material of claim 1,
in combination with a heater underneath the shape memory material, with the shape memory material between the heater and the conductive layer.

4. The shape-change material of claim 1, wherein the conductive layer is a conductive polymer layer.

5. The shape-change material of claim 1, wherein the conductive layer is a metal layer.

6. The shape-change material of claim 1, wherein the conductive layer is a deposited layer.

7. The shape-change material of claim 1, wherein the shape memory material layer includes a foam material.

8. The shape-change material of claim 1, wherein the shape memory material layer includes a shape memory polymer.

* * * * *